(12) United States Patent
Papallo, Jr. et al.

(10) Patent No.: US 8,189,311 B2
(45) Date of Patent: May 29, 2012

(54) CIRCUIT BREAKER CONTROL

(75) Inventors: Thomas Frederick Papallo, Jr., Farmington, CT (US); Theodore Drummond Hill, III, West Hartford, CT (US); Radoslaw Narel, Kensington, CT (US); Joseph Yuan Rao, Avon, CT (US)

(73) Assignee: General Electric Company, Schenetady, NY (US)

( * ) Notice: Subject to any disclaimer, the term of this patent is extended or adjusted under 35 U.S.C. 154(b) by 140 days.

(21) Appl. No.: 12/628,135

(22) Filed: Nov. 30, 2009

(65) Prior Publication Data

US 2011/0127852 A1 Jun. 2, 2011

(51) Int. Cl.
*H02H 3/00* (2006.01)

(52) U.S. Cl. ........................................ 361/64

(58) Field of Classification Search ................ 361/64
See application file for complete search history.

(56) References Cited

U.S. PATENT DOCUMENTS

| 5,546,265 | A | * | 8/1996 | Santos et al. ............ 361/93.2 |
| 5,808,848 | A | * | 9/1998 | Pollman et al. .......... 361/93.2 |
| 7,254,001 | B2 | * | 8/2007 | Papallo et al. ............... 361/64 |
| 7,486,496 | B2 | | 2/2009 | Gauxmann et al. |
| 7,518,475 | B2 | | 4/2009 | Mills et al. |
| 7,525,782 | B1 | * | 4/2009 | Hedrick et al. ........... 361/93.2 |

* cited by examiner

*Primary Examiner* — Rexford Barnie
*Assistant Examiner* — Ann Hoang
(74) *Attorney, Agent, or Firm* — Cantor Colburn LLP

(57) ABSTRACT

A method of circuit breaker control includes determining if a trip event for a circuit breaker has occurred, determining a set of redundancy parameters for the circuit breaker, and transmitting a trip signal and a shunt trip signal to the circuit breaker based on the set of redundancy parameters.

28 Claims, 4 Drawing Sheets

CIRCUIT BREAKER CONTROL

BACKGROUND OF THE INVENTION

The subject matter disclosed herein relates to electrical circuit breakers, and more particularly, to circuit breaker control.

Generally, electrical circuit breakers include a trip coil responsive to over-current events. The trip coil may "trip" if an over-current event exists. Furthermore, the trip coil may be responsive to trip signals of a trip unit. The trip coil may therefore also trip to open the circuit breaker in response to a trip signal. The trip signal may be initiated within the circuit breaker or transmitted to the circuit breaker from a central controller. The electrical circuit breakers may also include a shunt trip coil. The shunt trip coil may be a mechanical or electrical-mechanical trip coil. The shunt trip coil may trip if a mechanical linkage or trip lever is activated. The shunt trip coil may also be responsive to shunt trip signals of a trip unit. Therefore, the shunt trip coils may also trip in response to a shunt trip signal. The shunt trip signal may be initiated within the circuit breaker or transmitted to the circuit breaker from a central controller.

If an over-current event exists, the trip unit of the circuit breaker may sense the over-current condition, and attempt to open contacts of the circuit breaker. In situations where a relatively large current is flowing across the contacts of the circuit breaker, a large force may be necessary to open said contacts. If the trip coil does not provide enough force, the contacts may remain closed, and may allow the over-current condition to damage any components within the circuit of the circuit breaker.

Shunt trip coils may provide a relatively larger force to open contacts of the circuit breaker. Shunt trip coils may be signal-tripped coils, over-voltage coils, under-voltage coils, and/or any combination thereof. However, as shunt trip coils provide a relatively larger force than trip coils, there may be more power required to energize the shunt trip coil. Thus if a large number of shunt trip coils are energized at substantially the same time, a relatively significant amount of current is drawn.

Therefore, in scenarios where a limited amount power is available or desirable, it may be beneficial to limit the number of shunt trip coils and trip coils energizing at substantially the same time. Furthermore, if predetermined conditions exist, for example large current flow conditions or other similar conditions, it may be beneficial to energize a shunt trip coil alongside a trip coil to increase the force applied to electrical contacts of a circuit breaker.

Thus, example embodiments provide methodologies of circuit breaker control taking into consideration any system power limitations in addition to coil operation.

BRIEF DESCRIPTION OF THE INVENTION

According to one example embodiment, a method of circuit breaker control includes determining if a trip event for a circuit breaker has occurred, determining a set of redundancy parameters for the circuit breaker, and transmitting a trip signal and a shunt trip signal to the circuit breaker based on the set of redundancy parameters.

According to another example embodiment, a method of circuit breaker control of a plurality of circuit breakers of a protection system includes determining a status of a first circuit breaker of the plurality of circuit breakers. The first circuit breaker's status is indicative of a pending trip signal associated with the first circuit breaker. The method further includes transmitting a trip signal to the first circuit breaker based on the first circuit breaker's status, establishing a priority of the first circuit breaker in response to the trip signal, and transmitting a shunt trip signal to the first circuit breaker based on the first circuit breaker's priority.

According to yet another example embodiment, a circuit breaker protection system includes a plurality of circuit breakers, each circuit breaker of the plurality of circuit breakers including a trip device and a shunt trip device, and a first central processor in communication with each circuit breaker of the plurality of circuit breakers. According to the example embodiments, the first central processor is configured to perform a method of circuit breaker control including determining a status for each circuit breaker of the plurality of circuit breakers. Each circuit breaker's status is indicative of a pending trip signal associated with a respective circuit breaker. The method further includes transmitting a trip signal to each circuit breaker of the plurality of circuit breakers based on a respective circuit breaker's status, establishing a priority of each circuit breaker of the plurality of circuit breakers in response to a respective circuit breaker's trip signal, and transmitting a shunt trip signal to each circuit breaker of the plurality of circuit breakers based on a respective circuit breaker's priority.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
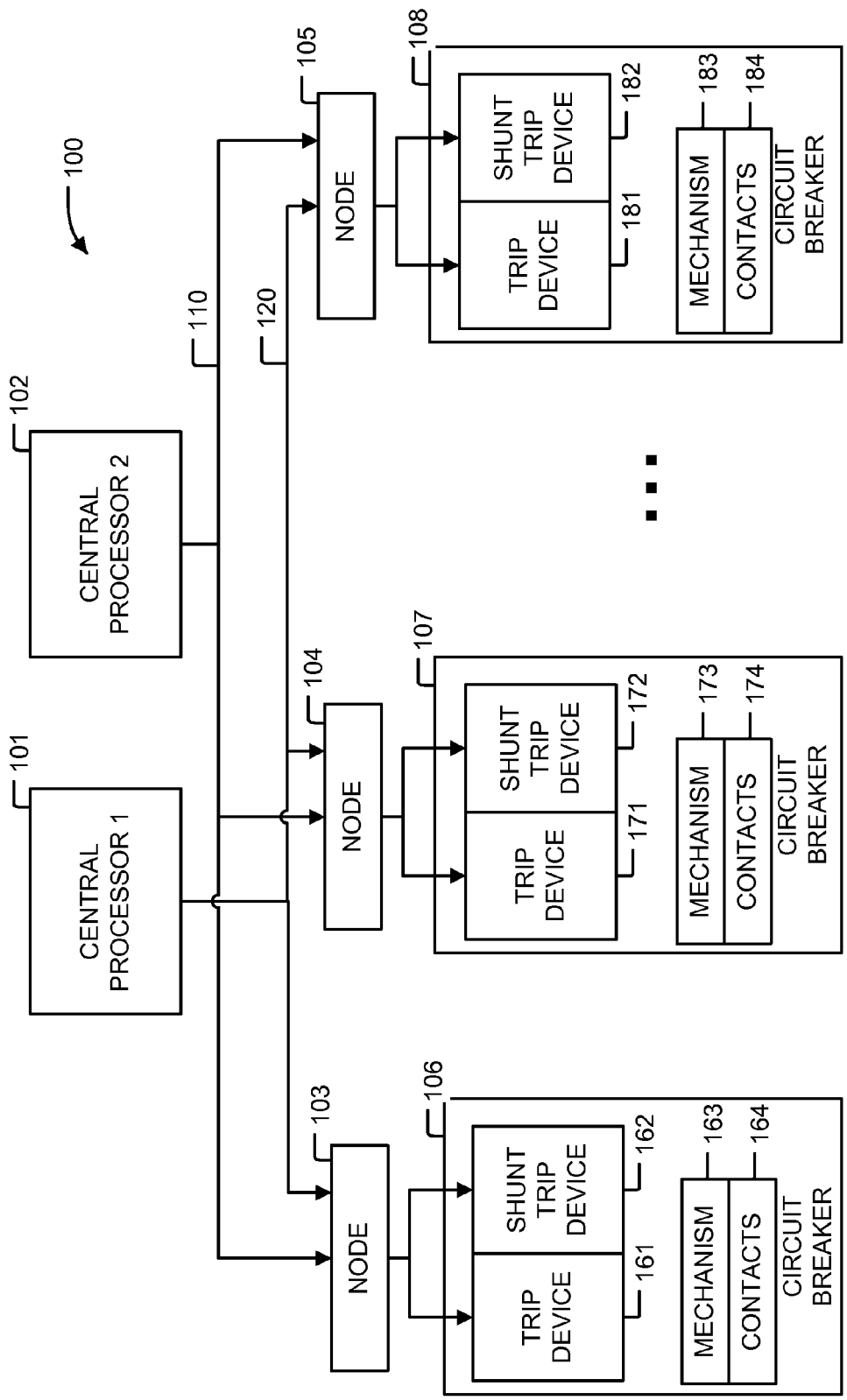
FIG. 1 is a system including circuit breaker control, according to an example embodiment.

The detailed description explains embodiments of the invention, together with advantages and features, by way of example with reference to the drawings.

DETAILED DESCRIPTION OF THE INVENTION

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Furthermore, as used herein, the term breaker refers to an electrical switching apparatus. The term breaker may be used interchangeably with electrical breaker, switching apparatus, circuit breaker, or any other suitable term referring to an arrangement of electrical contacts configured to interrupt an electrical current.

Moreover, the term network, as used herein, may refer to a communications network including a communication medium capable of transmitting electrical signals.

Additionally, the term node refers to a communication node configured, capable, and/or disposed to communicate with central processors and/or electrical circuit breakers. The communication node may further be configured, capable, and/or disposed to transmit an electrical signal indicative or a trip event to coils of the electrical circuit breakers. Furthermore, the communication node may, according to some example embodiments, be implemented as a trip unit or other suitable device.

Hereinafter, example embodiments of the present invention are described in detail with reference to FIGS. 1-4.

FIG. 1 is a system including circuit breaker control, according to an example embodiment. The system 100 includes two central processors, 101 and 102, executing a protection algorithm(s) configured to trip or open a plurality of circuit breakers based on protections events. The protection events may be transmitted to each central processor 101 and 102 individually or at substantially the same time. There may be a plurality of protection algorithms running on either central processor at any time. Furthermore, each processor may run the same protection algorithms as the other, so as to provide redundancy.

The system 100 further includes nodes 103, 104, and 105. Each node 103, 104, and 105 may be a communications node disposed to communicate with central processors 101 and 102 over communication medium 110 and 120, respectively. According to some example embodiments, the nodes 103, 104, and 105 may be trip units responsive to communications from the central processors 101 and 102. For example, nodes 103, 104, and 105 may receive communications, signals, or command signals from the central processors 101 and 102, and transmit trip signals and shunt trip signals to circuit breakers. The communication mediums 110 and 120 may be Ethernet connections or any other suitable medium for transmitting command signals, command packets, or other similar signals/signal packets indicative of trip events. Trip events may be events in which a trip, or opening of a circuit breaker, are desired.

For example, if it is determined through a protection algorithm that a particular circuit breaker should be tripped, a trip event has occurred. Thus, an electrical trip signal may be established in/through the protection algorithm and transmitted to the particular circuit breaker such that one or both protection coils may be tripped (i.e., energized to open a set of contacts). Circuit breakers and protection coils are described more fully below.

The system 100 may further include a plurality of circuit breakers 106, 107, and 108. Although only three circuit breakers are illustrated in FIG. 1, it is understood that more or less circuit breakers may be included depending upon any particular application of example embodiments.

Each circuit breaker 106, 107, and 108 may include at least two protection coils or devices (i.e., 161-162, 171-172, and 181-182). For example, trip devices 161, 171, and 181 may be trip devices, which may further include trip coils. These trip coils may be flux shifter coils, current-sensing coils, and/or any other suitable protection coil. A trip coil may be energized in response to a trip event such that contacts (i.e., 164, 174, 184) of a circuit breaker are opened through an associated mechanism (i.e., 163, 173, 183) of the circuit breaker. Trip coils may also be energized in response to a trip signal transmitted to the trip device such that a circuit is effectively opened.

Devices 162, 172, and 182 may be shunt trip devices, which may further include shunt trip coils. Shunt trip devices may be manual devices which may be tripped mechanically through mechanical linkages. Shunt trip coils may be voltage-sensing coils and/or manual trip coils, or other suitable protection coils responsive to activation manually with the shunt trip device or in response to a shunt trip signal. Thus, shunt trip coils may be energized in response to a shunt trip signal transmitted to the shunt trip device such that a circuit is effectively opened. Shunt trip coils may also be energized such that contacts (i.e., 164, 174, 184) of a circuit breaker are opened with greater force than a trip coil, through an associated mechanism (i.e., 163, 173, 183) of the circuit breaker. For example, a shunt trip coil may be energized with about ten to about twelve amps. However, a shunt trip coil may also not provide enough force to effectively open contacts in some circumstances. For example, it may be desirable to energize both a trip coil and a shunt trip coil of a particular circuit breaker at substantially the same time, through use of both trip and shunt trip signals. Therefore, example embodiments provide redundant and/or dual coil operation.

Figure 2:
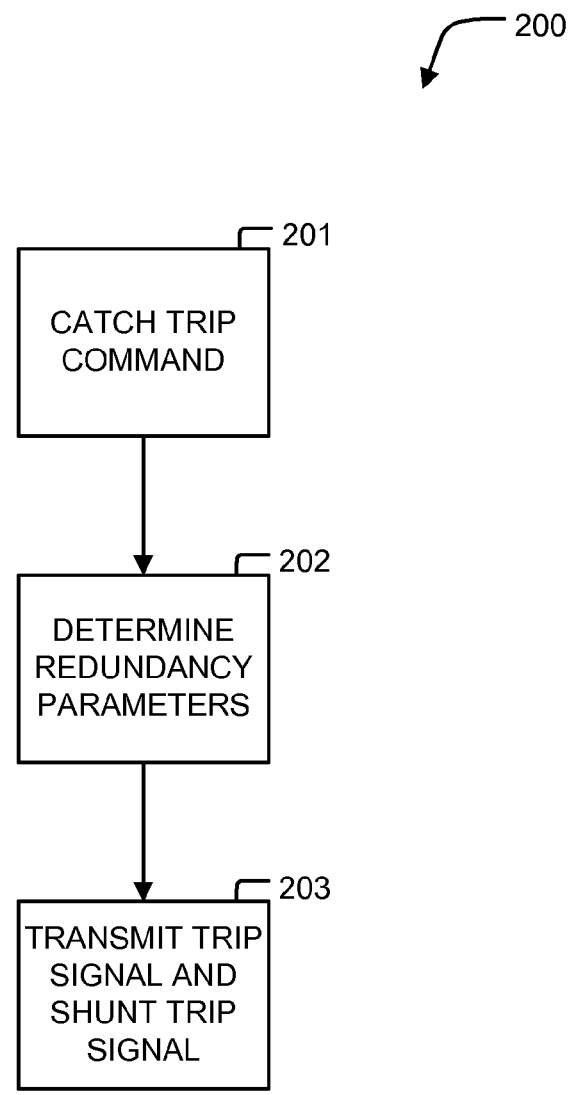
FIG. 2 is a flowchart of a method of circuit breaker control, according to an example embodiment.

FIG. 2 is a flowchart of a method of circuit breaker control, according to an example embodiment. The method 200 includes catching a trip signal at block 201. For example, a protection algorithm may determine a circuit breaker should be opened in response to a protection event (i.e. trip event). Thus, a central processor or other processor may issue an open commend/trip signal to a trip device of a circuit breaker. The trip signal may be caught through method 200 such that circuit breaker control may be established.

The method 200 further includes determining redundancy parameters and/or if a predetermined condition exists at block 202. For example, redundancy parameters may include power limitations, necessity of redundant and/or dual coil operation, concurrent trip coil open requests, and/or other suitable parameters. The predetermined condition may be a maximum or near-maximum number of shunt trip coils which may be energized at substantially the same time. The predetermined condition may also be a power limitation or other suitable condition. The method 200 further includes transmitting trip signal(s) based on the redundancy parameters.

For example, if a particular number of shunt trip coils and trip coils are being energized, the signals may be limited to only trip signals. Alternatively or in combination, the signals may be delayed before transmission such that higher priority circuit breakers are tripped with both shunt trip and trip coils. Also, existing shunt trip signals may be delayed if a higher priority trip signal has been caught. It is apparent that other scenarios may be applicable to circuit breaker control, therefore, a more detailed explanation of the methodologies of example embodiments is provided below with reference to FIGS. 3 and 4.

Figure 3:
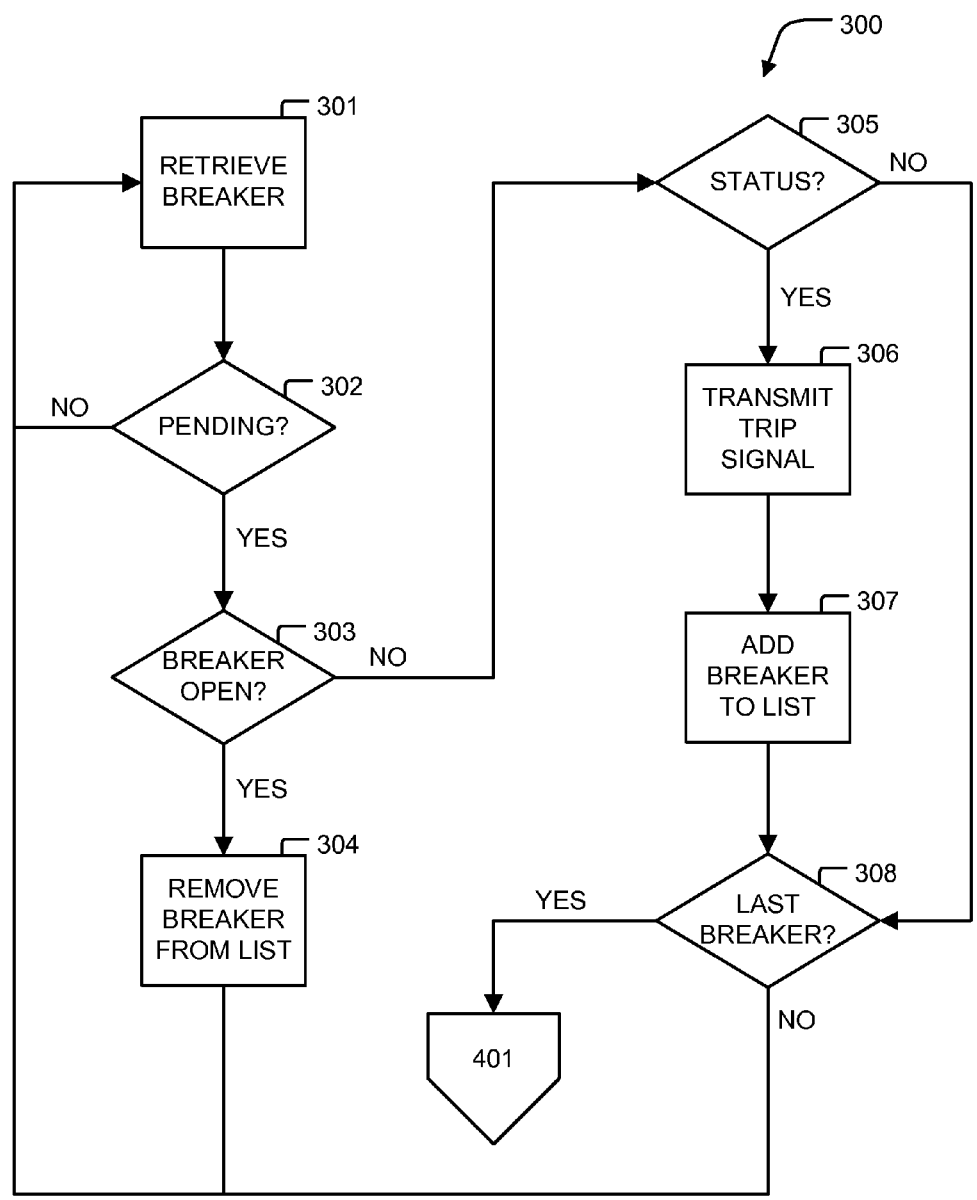
FIG. 3 is a flowchart of a method of circuit breaker control, according to an example embodiment.

FIG. 3 is a flowchart of a method of circuit breaker control, according to an example embodiment. The method 300 includes retrieving a circuit breaker at block 301. According to any given scenario, a plurality of circuit breakers may be included within a protection system. At any given time, any number of the plurality of circuit breakers may be opened or closed. As trip signals are caught (See FIG. 2), example methodologies may establish/determine a set of parameters which may be used to determine if a particular circuit breaker should be tripped. Accordingly, a circuit breaker (i.e., status of a circuit breaker) of the plurality of circuit breakers may be monitored/retrieved such that trip parameters may be determined.

The method 300 further includes determining if the retrieved circuit breaker (i.e., monitored breaker) is included in a pending circuit breaker list (i.e., breakers not considered by method 300 already) at block 302. If the retrieved circuit breaker is not, the next circuit breaker is retrieved at block 301. If the retrieved circuit breaker is included in the pending circuit breaker list, the method 300 includes determining if the pending circuit breaker is in an open state, or a closed state at block 303.

If the pending circuit breaker is opened, the circuit breaker is removed from the pending circuit breaker list at block 304, and the next circuit breaker is retrieved at block 301.

If the circuit breaker is not in an open state, the method 300 includes determining a status of the circuit breaker at block 305. For example, determining the status may include determining if a protection algorithm has requested the pending breaker be opened. For example, the status may be indicative of a pending trip signal associated with the circuit breaker. A pending trip signal may be a trip signal which has not yet been transmitted to an associated circuit breaker. If a protection algorithm has not requested the pending circuit breaker be opened (i.e., no pending trip signal), and the pending circuit breaker is not the last breaker in the system, the next circuit breaker is retrieved at block 301.

If a protection algorithm has requested the pending circuit breaker be opened (i.e., there is a pending trip signal), a trip signal to energize the trip coil of the circuit breaker is transmitted or set at block 306. Thereafter, the method 300 includes adding the pending circuit breaker to a circuit breaker list (i.e., breakers to be tripped with trip coils and shunt trip coils) at block 307, and determining if the pending circuit breaker is the last circuit breaker of the system to be retrieved at block 308. For example, adding the pending circuit breaker to the circuit breaker list may include establishing a priority for the breaker and inserting the circuit breaker into the list based on its priority. This circuit breaker priority may be established based on predetermined parameters, a circuit breaker's location within a protection circuit with regards to other circuit breakers, a circuit breaker identification number, or other suitable parameters.

If the pending circuit breaker is not the last circuit breaker of the system to be retrieved, the next circuit breaker is retrieved at block 301. If the pending circuit breaker is the last circuit breaker in the system to be retrieved, the method 300 continues to the method 400 at block 401.

Figure 4:
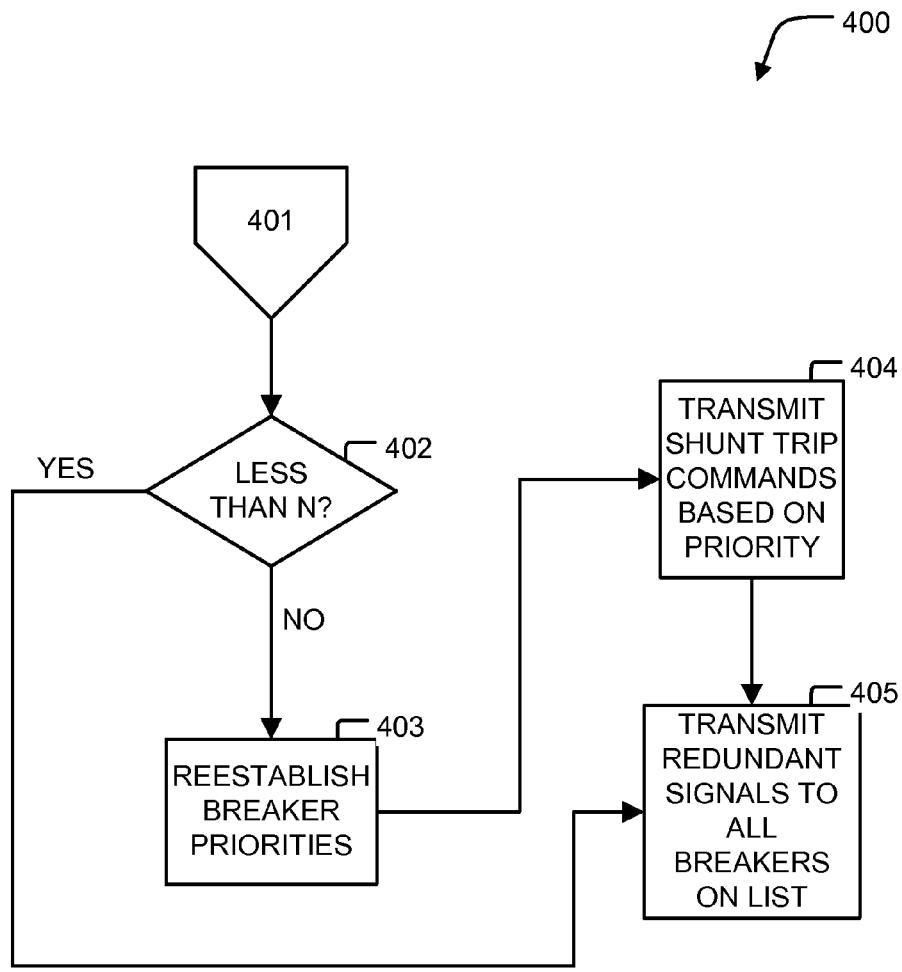
FIG. 4 is a flowchart of a method of circuit breaker control, according to an example embodiment.

FIG. 4 is a flowchart of a method of circuit breaker control, according to an example embodiment. The method 400 includes determining if a number of circuit breakers on a pending circuit breaker list is less than a number N at block 402. For example, the number N may be a maximum or near-maximum number of shunt trip coils which may be energized at substantially the same time based on a predetermined condition (e.g., power, in-rush current, etc). If the number of circuit breakers on the pending circuit breaker list is less than N, the method 400 includes transmitting trip signals and shunt trip signals to a group of circuit breakers of the pending circuit breaker list at block 405.

The group of circuit breakers may be circuit breakers of a predetermined priority, and this group may satisfy a difference between the number N and the number of active shunt trip signals. The predetermined priority may be a range of priority values established based on protection system requirements, circuit breaker locations within a protection circuit, or other suitable parameters. The predetermined priority values may also be determined based on the maximum number of active shunt trip signals available to a protection system compared to the number of circuit breakers which have pending trip signals, and/or additionally compared to the criticality of a circuit breaker or location of a circuit breaker within the protection system. Circuit breakers of a predetermined priority may also be higher priority circuit breakers, sorted from highest priority to lowest priority. Thus, higher priority circuit breakers may be tripped first.

If the number of circuit breakers on the pending circuit breakers list is not less than N, the method 400 includes reestablishing priorities for each circuit breaker on the pending circuit breaker list at block 403. The reestablished priorities may be based on the criticality of each pending circuit breaker with regards to system protection. For example, feeder breakers may be considered less critical than breakers closer to, or dedicated to, critical system components. Therefore, higher priorities are established for more critical circuit breakers such that trip signals and shunt trip signals for these more critical (i.e., higher priority) circuit breakers are transmitted before less critical circuit breakers. The higher priorities are predetermined priorities based on criticality as described above. Thus, the method 400 includes transmitting shunt trip signals to activate shunt trip coils for the circuit breakers, based on circuit breaker priority, such that the total number of energized shunt trip coils is less than or equal to N at block 404.

As described above, according to example embodiments, methodologies of circuit breaker control are described which provide benefits with regard to breaker control.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. A method of circuit breaker control, comprising:
  determining if a trip event for at least one circuit breaker of a plurality of circuit breakers has occurred;

determining a set of redundancy parameters for the plurality of circuit breakers;
determining a number of active shunt trip signals of the plurality of breakers; and
transmitting trip signals and shunt trip signals to each breaker of the plurality of breakers based on the number of active shunt trip signals and based on the set of redundancy parameters.

2. The method of claim 1, wherein determining the set of redundancy parameters includes:
determining if the at least one circuit breaker is in an open state; and
determining if a predetermined condition exists such that a shunt trip coil of the at least one circuit breaker is unable to trip.

3. The method of claim 2, wherein if the at least one circuit breaker is in an open state, the trip signal and the shunt trip signal are not transmitted to the at least one circuit breaker.

4. The method of claim 2, wherein if the predetermined condition exists the trip signal is transmitted to the at least one circuit breaker and the shunt trip signal is not transmitted to the at least one circuit breaker.

5. The method of claim 2, wherein if the at least one circuit breaker is not in an open state and the predetermined condition does not exist, the trip signal is transmitted to the at least one circuit breaker and the shunt trip signal is transmitted to the at least one circuit breaker.

6. A method of circuit breaker control of a plurality of circuit breakers of a protection system, the method comprising:
determining a status of a first circuit breaker of the plurality of circuit breakers, the first circuit breaker's status being indicative of a pending trip signal associated with the first circuit breaker;
transmitting a trip signal to the first circuit breaker based on the first circuit breaker's status;
establishing a priority of the first circuit breaker in response to the trip signal;
transmitting a shunt trip signal to the first circuit breaker based on the first circuit breaker's priority;
determining a number of active shunt trip signals of the plurality of breakers; and
transmitting shunt trip signals to each breaker of the plurality of breakers based on the number of active shunt trip signals.

7. The method of claim 6, further comprising determining a status of electrical contacts of the first circuit breaker, and transmitting the trip signal based on the electrical contacts' status.

8. The method of claim 6, wherein:
determining the status of the first circuit breaker includes determining a status for each circuit breaker of the plurality of circuit breakers, each circuit breaker's status being indicative of a pending trip signal associated with a respective circuit breaker;
transmitting the trip signal to the first circuit breaker includes transmitting a trip signal to each circuit breaker of the plurality of circuit breakers based on a respective circuit breaker's status;
establishing the priority of the first circuit breaker includes establishing a priority of each circuit breaker of the plurality of circuit breakers in response to a respective circuit breaker's trip signal; and
transmitting the shunt trip signal to the first breaker includes transmitting a shunt trip signal to each circuit breaker of the plurality of circuit breakers based on a respective circuit breaker's priority.

9. The method of claim 8, further comprising determining if a predetermined condition exists for the plurality of circuit breakers, and transmitting the shunt trip signals to a group of circuit breakers of the plurality of circuit breakers if the predetermined condition exists.

10. The method of claim 9, wherein the predetermined condition is a maximum number of active shunt trip signals.

11. The method of claim 9, wherein the group of circuit breakers includes only circuit breakers of a predetermined priority.

12. The method of claim 8, further comprising reestablishing priorities for each circuit breaker of the plurality of circuit breakers.

13. The method of claim 12, wherein reestablishing priorities for each circuit breaker includes:
establishing a second priority of each circuit breaker of the plurality of circuit breakers, the second priority of a circuit breaker being based on the location of a respective circuit breaker within the protection system.

14. The method of claim 13, wherein transmitting the shunt trip signals to each circuit breaker of the plurality of circuit breakers includes transmitting the shunt trip signal to circuit breakers of a predetermined priority.

15. The method of claim 13, further comprising determining if a predetermined condition exists for the plurality of circuit breakers, transmitting the shunt trip signals to a group of circuit breakers of the plurality of circuit breakers if the predetermined condition exists, the group of circuit breakers including circuit breakers of a predetermined priority.

16. The method of claim 15, wherein the predetermined condition is a maximum number of active shunt trip signals.

17. A circuit breaker protection system, comprising:
a plurality of circuit breakers, each circuit breaker of the plurality of circuit breakers including a trip device and a shunt trip device; and
a first central processor in communication with each circuit breaker of the plurality of circuit breakers, the first central processor being configured to perform a method of circuit breaker control, the method comprising:
determining a status for each circuit breaker of the plurality of circuit breakers, each circuit breaker's status being indicative of a pending trip signal associated with a respective circuit breaker;
transmitting a trip signal to each circuit breaker of the plurality of circuit breakers based on a respective circuit breaker's status;
establishing a priority of each circuit breaker of the plurality of circuit breakers in response to a respective circuit breaker's trip signal;
transmitting a shunt trip signal to each circuit breaker of the plurality of circuit breakers based on a respective circuit breaker's priority;
determining a number of active shunt trip signals of the plurality of breakers; and
transmitting shunt trip signals to each breaker of the plurality of breakers based on the number of active shunt trip signals.

18. The system of claim 17, wherein each circuit breaker's status is retrieved from a protection algorithm executed on the first central processor.

19. The system of claim 17, wherein each pending trip signal is established in a protection algorithm executed on the first central processor.

20. The system of claim 17, wherein each trip signal is transmitted to a respective trip device of each circuit breaker.

21. The system of claim 20, wherein each trip device of the plurality of circuit breakers energizes a trip coil in response to a received trip signal.

22. The system of claim 17, further comprising a second central processor in communication with each circuit breaker of the plurality of circuit breakers, the second central processor being configured to perform the method of circuit breaker control of the first central processor redundantly.

23. The system of claim 17, further comprising a plurality of communication nodes, each communication node of the plurality of communication nodes being in communication with one circuit breaker of the plurality of circuit breakers, and the first central processor.

24. The system of claim 23, wherein each communication node of the plurality of communication nodes is a trip unit of a respective circuit breaker.

25. The system of claim 17, wherein the method of circuit breaker control further includes determining if a predetermined condition exists for the plurality of circuit breakers, transmitting the shunt trip signals to a group of circuit breakers of the plurality of circuit breakers if the predetermined condition exists, the group of circuit breakers including circuit breakers of a predetermined priority.

26. The system of claim 25, wherein the predetermined condition is a maximum number of active shunt trip signals of the protection system.

27. The system of claim 17, wherein each shunt trip signal is transmitted to a respective shunt trip device of each circuit breaker.

28. The system of claim 27, wherein each shunt trip device of the plurality of circuit breakers energizes a shunt trip coil in response to a received shunt trip signal.

* * * * *